United States Patent [19]

Brandt et al.

[11] 3,896,657
[45] July 29, 1975

[54] VERTICAL IMPACT TESTER
[75] Inventors: Neill M. Brandt, Sturbridge; Richard D. Courtemanche, Southbridge; Bruce D. Johnson, Sturbridge, all of Mass.
[73] Assignee: American Optical Corporation, Southbridge, Mass.
[22] Filed: May 7, 1973
[21] Appl. No.: 358,247

[52] U.S. Cl. .................................... 73/12; 73/12
[51] Int. Cl.² ...................... G01N 3/62; G01N 3/30
[58] Field of Search ........................... 73/12, 82, 87

[56] References Cited
UNITED STATES PATENTS

| | | | |
|---|---|---|---|
| 2,163,847 | 6/1939 | Perrey | 73/12 |
| 2,264,412 | 12/1941 | Shindel | 73/12 |
| 2,755,658 | 7/1956 | Brown | 73/12 |
| 3,488,991 | 1/1970 | Dietert et al. | 73/12 |
| 3,724,260 | 4/1973 | Bole | 73/12 |

OTHER PUBLICATIONS
Spangler & Cooper, "Equipment to Measure the Energy Absorption of Films at High Strain Rates," J. of App. Physics, Vol. 28, No. 3, Mar. 1957 pp. 329–333.

Primary Examiner—James J. Gill
Assistant Examiner—Anthony V. Ciarlante
Attorney, Agent, or Firm—H. R. Berkenstock, Jr.; William C. Nealon

[57] ABSTRACT

Impact testing apparatus, for testing frangibility or the like of materials, including an anvil for supporting a test specimen, provides a spherical missile support vertically above the anvil at a fixed distance thereabove, and means for propelling the missile from the support at velocities in excess of free fall velocities onto the test specimen on the anvil. The apparatus permits a variable impact energy of the missile against the test specimen without changing the missile size or weight and without changing the flight path distance of the missile.

4 Claims, 6 Drawing Figures

PATENTED JUL 29 1975  3,896,657
SHEET 1
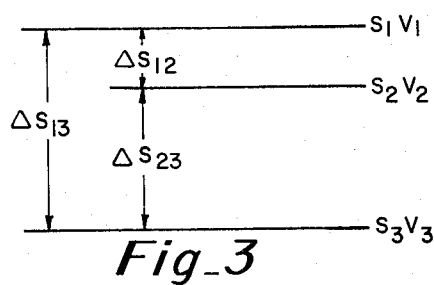
Fig_3
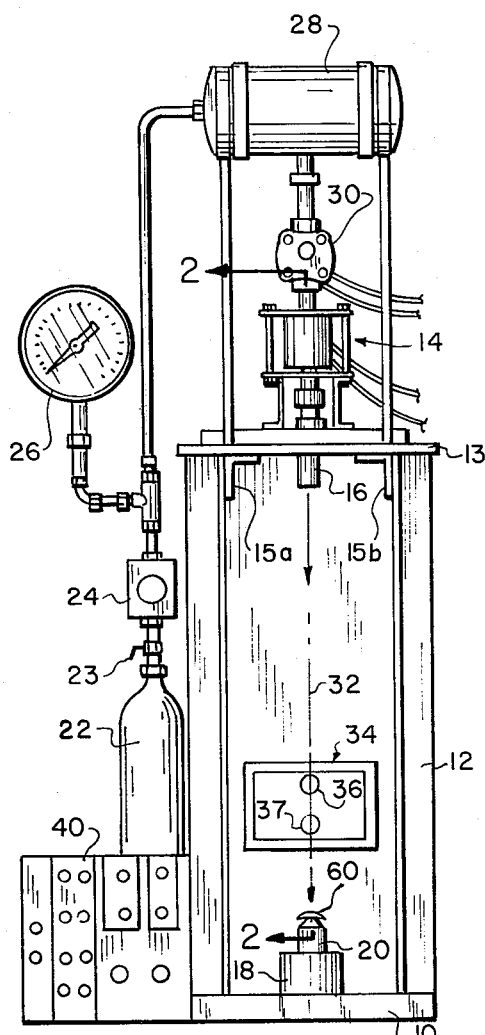
Fig_1
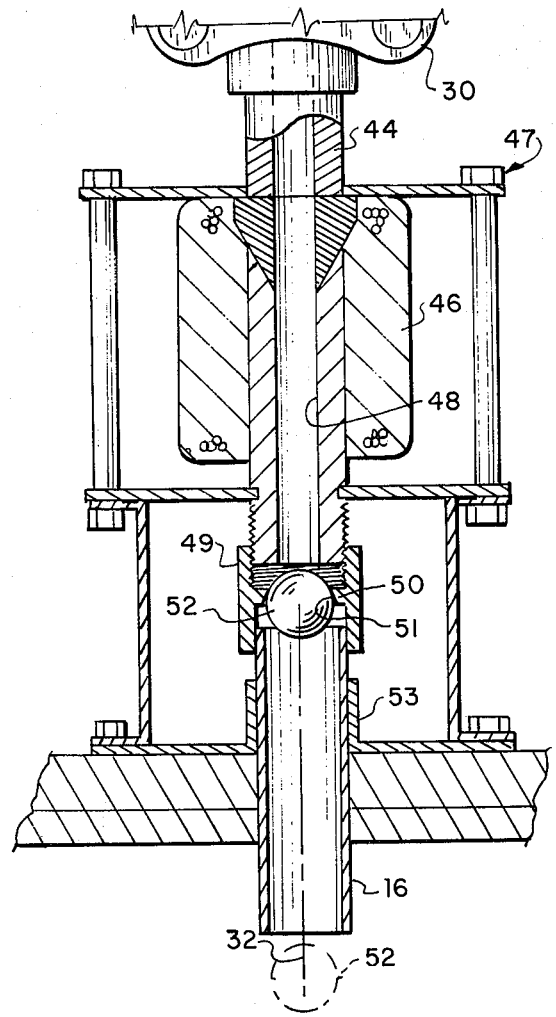
Fig_2
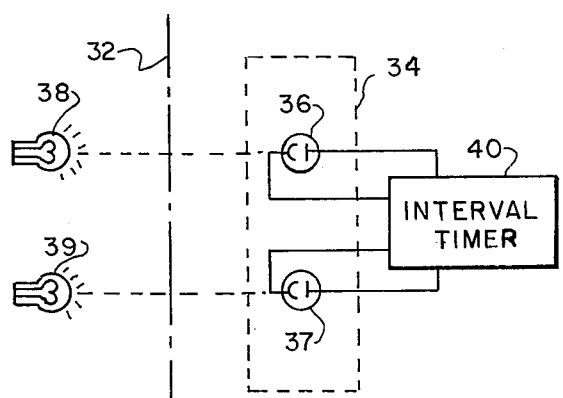
Fig_4

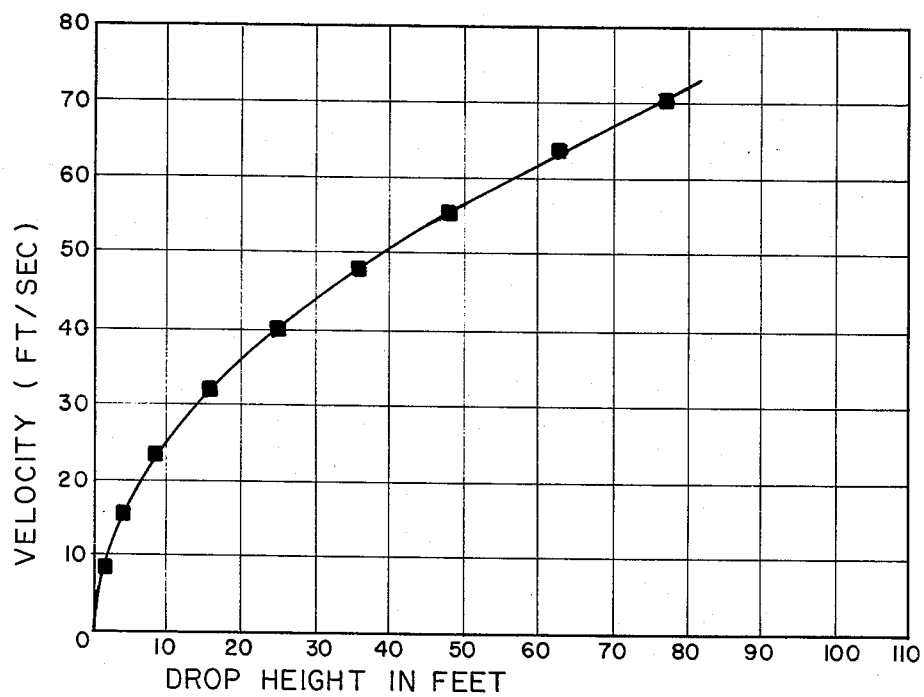
*Fig_5*
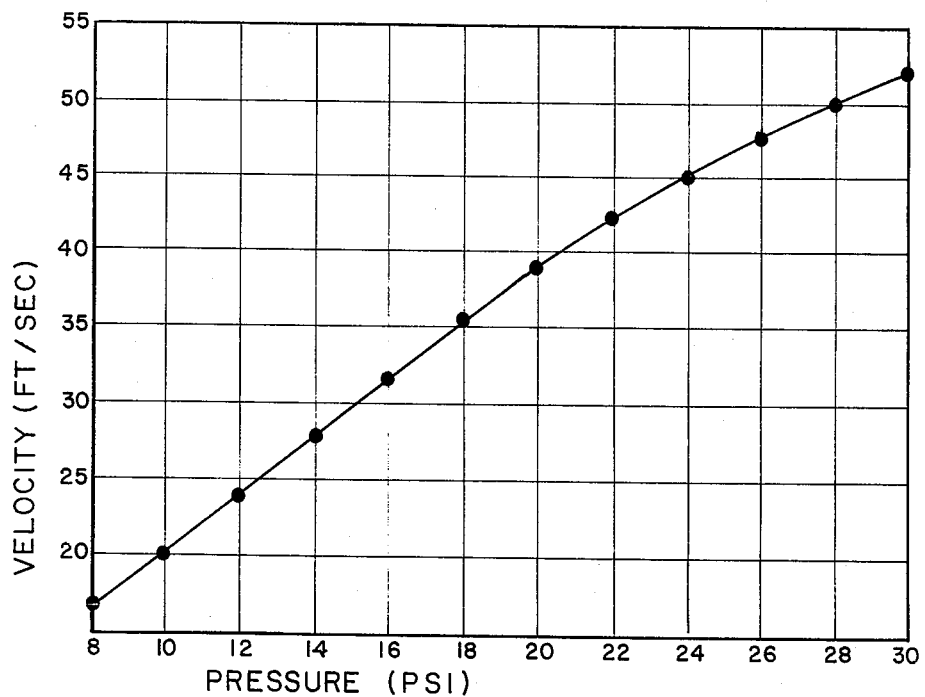
*Fig_6*

VERTICAL IMPACT TESTER

BACKGROUND OF THE INVENTION

1. Field of the Invention

Impact testing apparatus with particular reference to a variable impact energy produced by a constant size and weight missile at a constant vertical path distance of the missile.

2. Description of Prior Art

A conventional ball test fixture, for example, for testing frangibility of lenses, usually consists of vertical guide rods supporting a movable electromagnetic chuck which functions as a holding device for a magnetic, steel ball which is to be dropped on a test specimen. The distance between the position of the test specimen and the position of the ball (height of the ball above the test specimen) determines the energy with which the ball will impact the specimen. The height of guide rods is a limiting factor in determining maximum energy produced with a particular size steel ball.

A major disadvantage of conventional test equipment is that, in many cases, particularly where a constant ball size is maintained, not enough height is available to produce sufficient energy to cause all specimens to fracture. If fracture does not occur at the maximum height of the test apparatus with a particular size of ball, a larger and heavier ball must be substituted to increase the maximum energy. Introducing different sizes of missiles into the test equipment varies the energy, momentum, missile weight, diameter, and contact area, thus complicating the analysis of obtained data. Another disadvantage of the conventional test equipment is the problem of alignment between the electromagnet and the target to assure that the steel ball strikes the target directly on center.

SUMMARY OF THE INVENTION

The present invention provides an anvil for supporting a test sample and a superpositioned "missile firing chamber" which fires a missle, propelling it vertically downwardly onto the specimen on the anvil. The missile is magnetic and spherical in shape. It is held in firing position in a non-magnetic, adjustable collar by the magnetic force of an electro-magnet centered in the firing chamber. A propelling medium (air, helium, other gases, etc.) passes through the tubular core of the electromagnet and acts on the ball propelling it toward the target. The firing chamber includes a barrel extending downwardly beyond the electromagnet so as to maintain the force of the fluid medium propelling the missle toward the anvil, and guide the missile to insure that it strikes the target with the desired energy and in the correct position. The desired propellant pressure of the propelling gas is set and is indicated on a gauge. An accumulator in the line ahead of the "missile firing chamber" provides a sufficient volume of the gas under pressure to propel the missile through the barrel so that a pressure drop does not occur in the barrel, which would decrease the ball acceleration. A normally closed solenoid valve provides the trigger to release the gaseous medium stored in the accumulator for propelling the ball down the barrel. The velocity of the ball is measured by the interruption of two light beams in a timing fixture, and the time elapsed is measured in seconds or fractions of a second. By relatively simple calculations and applying some basic laws of physics, the velocity and the energy of the missile can be measured at any point.

ADVANTAGES OF THE INVENTION

One advantage of the present invention is that the physical height limitation, such as found in the prior art, is not a factor since the missile receives its velocity, not from the dropping height, but from the acceleration produced by fluid pressure. The limitation of energy is governed by the maximum fluid pressure available, and with the availability of high pressure bottle gases, such pressures may exceed 1,000 lb. per square inch (psi). The invention enables the testing of the impact breakage performance of glass, plastics and other materials to be conducted, maintaining a constant missile size, thus incrementing velocity alone. This eliminates problems created by the introduction of multiple missile sizes into the testing procedure. This is especially important because it is known that the larger the missile diameter, the further it must be dropped to produce failure by spalling if the glass is flexible.

An additional advantage of the invention is that the apparatus is small and portable, therefore it may be set up wherever electrical outlets and compressed air or bottled gas are available. Furthermore, unlike conventional drop ball testers which are usually fastened to the floor or wall for support, the present invention provides a more compact unit which is self-contained and has its own support from its base plate.

A still further advantage of the invention comes from the compact design. This design utilizes a short vertical flight path of the missile which provides a nearly perfect alignment of the missile to the target, thereby insuring a repetitious target hit.

GENERAL DESCRIPTION OF THE DRAWINGS

FIG. 1 is a front elevational view of an impact tester according to the invention;

FIG. 2 is an enlarged detailed view of the missile holding means in cross section, of the device of FIG. 1, taken along section line 2—2;

FIG. 3 is a diagrammatic representation of the distances involved for calculating the impact velocity of the missile;

FIG. 4 is a schematic view of one form of timing mechanism for the velocity of the missile of the tester;

FIG. 5 is a plot of drop height versus velocity; and

FIG. 6 is a plot of propellant pressure versus velocity.

DESCRIPTION OF PREFERRED EMBODIMENTS

In the embodiment shown in FIG. 1, a base plate 10 is arranged to seat on a horizontal surface supporting the test mechanism. Due to small size of the tester, the unit need not be secured to a horizontal support or to a wall. A vertical back plate 12 supports a firing chamber, shown in general by numeral 14, which includes a downwardly directed barrel 16. Depending from the base plate 10 is an anvil support 18 supporting an anvil 20 vertically below the barrel 16, and centerwise aligned thereiwth. Extending forwardly of the top of the vertical plate 12 is a horizontal plate 13, also supported by angle brackets 15a and 15b. The plate 13 supports the firing chamber 14 in position.

The fluid pressure system includes a supply bottle 22 of gas under pressure, but which may be a line of compressed air, or other compressed gas, a pressure regulator 24 (which may be a conventional pressure regulator), a pressure gauge 26 and an accumulator 28. The accumulator is a tank providing volume of gas under pressure which may be released through a solenoid valve 30 into the "ball firing chamber."

A missile fired from the barrel 16 passes along a vertical flight line 32 to the specimen on the anvil 20, and the missile passes a light beam, timing fixture, shown in general by numeral 34. The timing system provides two photoelectric cells 36 and 37, each receiving a light beam from lamps 38 and 39, respectively. A missile dropping along the vertical flight path 32 successively interrupts the beams, and the interval of time between the breaking of the upper and the lower beam is measured on an interval timer 40. Such timing fixture and interval timer are conventional items, and further description is not believed necessary for a full understanding of the invention.

The missile firing chamber, illustrated in detail in FIG. 2, includes a short, fluid line 44 extending from the solenoid valve 30 into a tubular core electromagnet 46 supported in a framework, shown in general by numeral 47. A hollow tube 48, formed of magnetic material, provides a hollow, fluid carrying core for the electromagnet 46, and it terminates in an adjustable collar 49 of non-magnetic material. The collar is adjustably, threadedly engaged with the end of the tube 48. The collar 49 includes an internal annular shoulder 50 with a biased passage 51, against which a magnetic spherical missile 52 rests. The barrel 16 extends through a sleeve 53 into the adjustable collar 49 and provides an alignment and fluid pressure holding barrel for a propelled missile 52. The collar is adjusted to a position where the missile 52 is securely held against the shoulder 50 but not in contact with the magnetic tube 48; thus the missile is held in the magnetic field without contact to the magnetic tubular member. The tube 16 and the anvil 20 are centered on the flight path center 32 so that a specimen 60 may be, also, centered on the flight path for providing reproducible center strikes of the missile on subsequent specimens.

For operating the device, a missile 52 is placed against the shoulder 50 of the collar 49 with the electromagnet 46 energized so that the magnetic field induced in the tube 48 holds the missile in position against the shoulder. A specimen is placed on the anvil 20 centered on the missile flight line center 32. The system for the fluid pressure is pressurized by opening valve 23 on the supply 22, and the pressure regulator is set to produce the desired pressure as shown on gauge 26. This introduces fluid under pressure into the accumulator 28 up to the normally closed solenoid valve 30. With the interval timer actuated and a specimen 60 in place, the solenoid 30 is activated to release propellant under pressure into tube 48, breaking the magnetic hold on the missile and causing it to be propelled down the barrel. The barrel forms the beginning stages of the missile's flight, and also acts to maintain the force of the fluid under pressure against the missile in the barrel to insure that the missile accelerates to a desired velocity whereby it strikes the target with the desired energy and in the correct position. As pointed out above, the missile is accelerated toward the specimen resting on the anvil and the velocity of the missile is measured by the interruption of the two spaced light beams in the timing fixture. The distance between the two beams is known, and the velocity and the strike energy of the missile may be determined for any point.

CALCULATIONS

The impact energy of the missile is determined from the velocity of the missile which is measured as it passes through the two light beams. The lower light beam is a predetermined distance above the test specimen, and the acceleration due to gravity after the missile passes through the lower beam must be determined. To determine the impact energy, the impact velocity is determined by the following method:

FIG. 3 diagrammatically illustrates the positions of the various elements where:

$S_1$ is the position of the first light beam
$S_2$ is the position of the second light beam
$S_3$ is the position of the test specimen
$\Delta S_{12}$ is the distance between the two light beams in feet
$\Delta S_{23}$ is the distance between the lower light beam and the test specimen in feet.
$V_1$ is the velocity of the missile at the first light beam in ft./sec.
$V_2$ is the velocity of the missile at the second light beam in ft./sec.
$V_3$ is the velocity of the missile at the test specimen, also, known as the impact velocity in ft./sec.

Using the equations of uniformly accelerated motion, the following equations are applicable:

1. $S_2 = S_1 \ 30 \ V_1 t + \frac{1}{2} at^2$ where
$t$ = measured time between $S_1$ and $S_2$ (seconds)
$a = g$ = gravitational constant (32.2 ft./sec.$^2$) solving the equation for $V_1$, 2. $V_1 = \dfrac{S_2 - S_1 - \frac{1}{2} at^2}{t}$ The velocity at $S_2$ can be calculated by using the equation 3. $V_2 = \sqrt{V_1^2 + 2gH}$ where
$H = \Delta S_{12}$ = distance between the two photocells (feet) substituting $\Delta S_{12}$ gives:

4. $V_2 = \sqrt{V_1^2 + 2g\Delta S_{12}}$

Using equation (3), the velocity $V_3$ can be determined by substituting $\Delta s_{13}$ for $H$, when either $V_1$ or $V_2$ is known.

Solving for $V_3$ when $V_1$ is known gives $V_3 = \sqrt{V_1^2 + 2g \ \Delta S_{13}}$ and when $V_2$ is known $V_3 = \sqrt{V_2^2 + 2g \ \Delta S_{23}}$ With the velocity of $V_1$, $V_2$ or $V_3$ known and, also, knowing the time, the kinetic energy at impact of the test specimen may be determined by the equation $KE = \frac{1}{2} MV^2$ where
$KE$ = kinetic energy at impact (ft.-lbs.) where
$M$ = mass of the missile, also, equal to $W/g$ where
$W$ = weight of the missile in pounds;
substituting $V_3$ for $V$ gives the following formula: $KE_{s_3} = \frac{1}{2} W/g \ V_3^2$ In the present system, the velocity shown in the time interval countermeasures the average velocity between the points $S_1$ and $S_2$. Therefore, to determine the actual $V_3$, using the velocity obtained from the measuring system (herein called $V_M$), $$V_3 = \sqrt{V_M^2 + 2g\left[\tfrac{1}{2}\Delta S_{12} + \Delta S_{23}\right]}$$

Using various values for $V_M$ a computer program may be easily written to calculate $V_3$ and, also, to calculate $KE_{S_3}$ from each value of $V_M$.

The graph of FIG. 5 shows the velocity of free fall of a missile from various heights, with the line indicating the impact velocity from the height from which the missile is dropped. Using the formula set out above, a chart such as shown in FIG. 6 may be established for a particular missile correlating the impact velocity in feet per seconds at a particular pressure for the test apparatus. Comparing FIG. 5 with FIG. 6, it is readily observed that greater velocities are obtained more conveniently with the device of the invention. For example, for free fall an impact velocity of 50 ft./sec. is achieved with a 40 foot fall of a missile, but with the invention a pressure of 28 psi achieves the same velocity. The impact energy of the missile may be easily calculated from the known velocities, as found from a chart such as in FIG. 6. Also, from the formula and the charts, a table such as shown in Table I below, may be calculated for any propelled missile, vertical tester using a fixed missile size, to thereby predict the pressures needed to produce the desired impact velocity or impact energy. Table I below is calculated on the basis of a ⅝ inch steel ball using a 0.688 internal diameter barrel:

TABLE I

| Impact Energy (Ft.-Lbs.) | Pressure PSI | Impact Velocity (Ft./Sec.) |
|---|---|---|
| 0.40 | 13.5 | 26.5 |
| 0.45 | 14.3 | 28.1 |
| 0.50 | 15.1 | 29.7 |
| 0.55 | 15.9 | 31.1 |
| 0.60 | 16.5 | 32.4 |
| 0.65 | 17.2 | 33.8 |
| 0.70 | 17.8 | 35.1 |
| 0.75 | 18.5 | 36.3 |
| 0.80 | 19.2 | 37.5 |
| 0.85 | 19.9 | 38.7 |
| 0.90 | 20.6 | 39.8 |
| 0.95 | 21.3 | 40.9 |
| 1.00 | 22.0 | 41.9 |
| 1.05 | 22.7 | 43.0 |
| 1.10 | 23.4 | 44.0 |
| 1.15 | 24.1 | 45.0 |
| 1.20 | 24.9 | 45.9 |
| 1.25 | 25.7 | 46.9 |
| 1.30 | 26.3 | 47.8 |
| 1.35 | 27.1 | 48.7 |
| 1.40 | 27.8 | 49.6 |
| 1.45 | 28.5 | 50.5 |
| 1.50 | 29.3 | 51.4 |
| 1.55 | 30.0 | 52.2 |

Tables may, also, be easily calculated to convert elapsed time counter readings (which measures the elapsed time over the known distance between the two light beams) directly into velocity and energy. Thus, with the aid of these few tables and graphs, the velocity and energy of the impact missile may be easily measured and/or predicted. The vertical impact tester provides a piece of novel equipment for testing impact performance strength, which is versatile and has substantial advantages over conventional testing equipment. With the increased interest in mechanical safety of eyewear, the invention has applications as a routine instrument in dispensing laboratories. It effectively extends the range of high mass impact testing beyond the range of conventional ball drop testing equipment.

What is claimed is:

1. Impact testing apparatus comprising:
   a. base means arranged to be positioned level,
   b. specimen support means for test specimens of frangible material or the like mounted on said base means,
   c. upwardly directed frame means depending from said base means,
   d. missile directing tubular barrel means mounted on said frame means positioned vertically above said specimen support means,
   e. solenoid means mounted on said frame means above said tubular barrel means, including a magnetizable tubular core,
   f. non-magnetic adjustable connector means between said tubular barrel means and said tubular core inclusive of a missile supporting internal shoulder, for varying the position of said internal shoulder with respect to the end of said tubular core,
   g. gas line means connected to said tubular core,
   h. valve means for opening and closing said gas line means,
   i. an enlarged gas chamber communicating with said valve means providing a volume of gas for propelling a missile held in said tubular barrel toward said specimen support means at a velocity greater than that achieved by a gravity fall of a missile,
   j. supply means for said enlarged gas chamber,
   k. means for controlling the pressure of gas from said supply means to said enlarged gas chamber, and
   l. means for determining the velocity of a missile propelled toward said specimen support at a predetermined height above said specimen support.

2. Impact testing apparatus according to claim 1 wherein said valve means for opening and closing said gas line is a solenoid operated valve.

3. Impact testing apparatus according to claim 1 wherein said supply means includes pressure control means to provide gas at a predetermined pressure to said enlarged gas chamber.

4. Impact testing apparatus according to claim 1 wherein said adjustable connector is threadably engaged with said tubular core.

* * * * *